United States Patent
Rothkegel

(10) Patent No.: US 9,174,831 B2
(45) Date of Patent: Nov. 3, 2015

(54) LIFTING PLATFORM AND CARRYING ELEMENT FOR LIFTING PLATFORM WITH WEIGHT MEASUREMENT

(71) Applicant: HERRMANN AG, Pösing (DE)

(72) Inventor: Roland Rothkegel, Berlin (DE)

(73) Assignee: HERRMANN AG (DE)

( * ) Notice: Subject to any disclaimer, the term of this patent is extended or adjusted under 35 U.S.C. 154(b) by 184 days.

(21) Appl. No.: 14/154,532

(22) Filed: Jan. 14, 2014

(65) Prior Publication Data

US 2014/0196960 A1    Jul. 17, 2014

(30) Foreign Application Priority Data

Jan. 14, 2013   (DE) .................. 10 2013 100 354

(51) Int. Cl.
| | |
|---|---|
| *B66F 7/28* | (2006.01) |
| *B66F 17/00* | (2006.01) |
| *G01G 3/14* | (2006.01) |
| *G01G 19/02* | (2006.01) |

(52) U.S. Cl.
CPC . *B66F 17/00* (2013.01); *B66F 7/28* (2013.01); *G01G 3/141* (2013.01); *G01G 3/1404* (2013.01); *G01G 19/02* (2013.01)

(58) Field of Classification Search
CPC .......... B66F 7/28; B66F 17/00; G01G 19/02; G01G 3/1401; G01G 3/141
See application file for complete search history.

(56) References Cited

U.S. PATENT DOCUMENTS

| | | | | |
|---|---|---|---|---|
| 8,431,839 B2 * | 4/2013 | Hornstein | ...................... | 177/141 |
| 8,975,541 B2 * | 3/2015 | Hornstein | ...................... | 177/146 |
| 2008/0296071 A1 | 12/2008 | Herrmann | ...................... | 177/136 |
| 2010/0276212 A1 * | 11/2010 | Hornstein | ...................... | 177/146 |

FOREIGN PATENT DOCUMENTS

| | | | | |
|---|---|---|---|---|
| DE | 100 43 359 | 3/2002 | ............. | G01G 19/08 |
| DE | 10 2007 051 389 | 5/2009 | ............... | B66F 7/28 |
| EP | 1 876 136 | 1/2008 | .............. | B66F 17/00 |

* cited by examiner

*Primary Examiner* — Randy W Gibson
(74) *Attorney, Agent, or Firm* — Hayes Soloway P.C.

(57) ABSTRACT

An apparatus for lifting motor vehicles, with a carrying element for carrying the motor vehicle to be lifted, wherein this carrying element has at least one sensor device for detecting a weight force of the vehicle to be lifted, wherein the carrying element has at least two carrying arms which are arranged in a central region of the carrying element and which starting from the central region extend in at least two different directions. At least one sensor element for detecting a partial weight force is provided in each case on these carrying arms, wherein a force determining device for determining the weight force takes into consideration the partial weight forces determined by the at least three sensor elements.

15 Claims, 2 Drawing Sheets

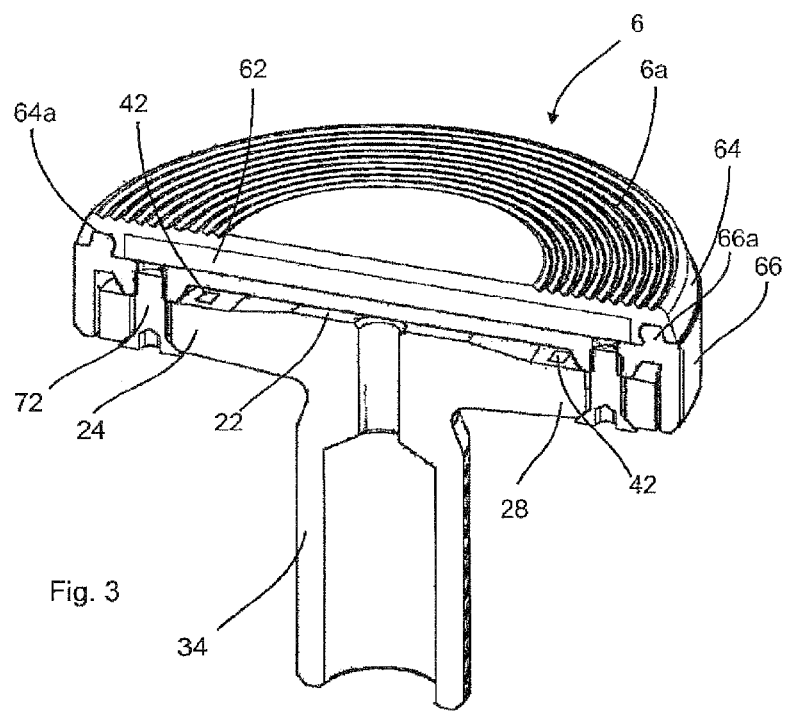
Fig. 3
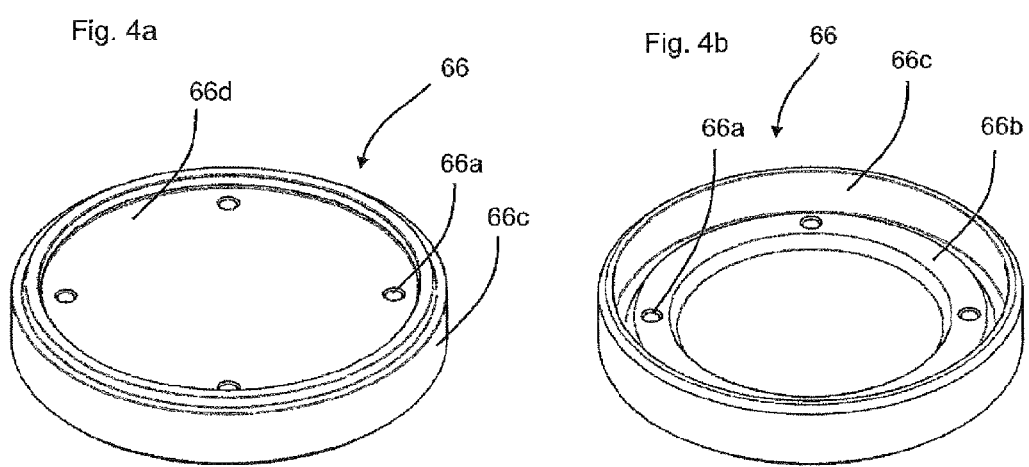
Fig. 4a
Fig. 4b

LIFTING PLATFORM AND CARRYING ELEMENT FOR LIFTING PLATFORM WITH WEIGHT MEASUREMENT

The present invention relates to an apparatus for lifting motor vehicles, and in particular to a lifting platform. Lifting platforms of this type have long been known from the prior art. In this case vehicles are lifted by means of hydraulic or electrical drives in order, in particular, to be able to carry out repairs beneath the vehicle.

In recent years lifting platforms have also become known which, during the loading procedure in particular, determine a load weight of the motor vehicle present on it. In addition, it has become known in this case for the weight forces to be measured separately at different support points, for example below the four receiving points of motor vehicle. In this way, it can be ascertained for example if a vehicle is not standing on the lifting platform properly or is threatening to fall off.

Weight measurement apparatus of this type, for example in the form of pressure load cells or strain gauges, operate, however, in the prior art in this case in part relatively imprecisely with respect to the introduction of the load and the weight indication thereof frequently depends upon the precise point of a corresponding carrier at which the vehicle is precisely supported.

The object of the present invention is therefore to make available receiving elements of a lifting platform for motor vehicles which make possible a more precise weight measurement. This object is attained according to the invention by the subjects of the independent claims.

Advantageous embodiments and further developments form the subject matter of the sub-claims.

An apparatus according to the invention for lifting motor vehicles has a carrying element for carrying the motor vehicle to be lifted, this carrying element having at least one sensor device for detecting a weight force and/or a value—characteristic of the weight force—of the vehicle to be lifted. In addition, the carrying element has at least two carrying arms which are arranged in a central region of the carrying element and which starting from the central region extend in at least two different directions. According to the invention at least one sensor element for detecting a partial weight force (and/or a value characteristic of this partial weight force) is provided in each case on these carrying arms, in which case a force determining device for determining the weight force takes into consideration the partial weight forces determined by the at least two sensor elements.

In contrast to the prior art it is therefore proposed that the individual carrying element, which in particular supports a specific partial region of the vehicle, has at least two sensors which are preferably arranged at a distance from each other and which thus measure point-wise the weight forces which occur. The introduction of force into the sensor devices thus advantageously takes place in a point-wise and not flat manner. In this way, a more precise measurement of the weight forces which occur is made possible. It is advantageous for these two sensor elements to be designed in the same way. It is preferable for these at least two sensor elements to be controlled independently of each other.

The sum of the individual load acting upon the loading points of the carrier or carrying elements corresponds to the overall load carried by the carrying element.

It is advantageous for a sum value or, in general, a value which is characteristic of a sum of the values issued by the individual sensor elements to be taken into consideration. In other words, it is preferable for the sensor elements to emit at least one value or one signal which is characteristic of a weight force acting upon this sensor element. In this way, it is advantageous for the acting force measured by the sensor device to be formed from at least two components determined separately.

In this case the sum of the individual loads acting upon the individual loading points of the carrying element corresponds to the overall load carried by the carrying element. In this case it would also be possible for a processor device to compare the individual loads with one another if for example one of these measured individual loads deviated substantially from the other measured individual loads, this could be an indication that the corresponding sensor device is defective. In this case the value measured by this sensor device can be factored out when the overall load is determined and instead of this value for example an average value of the values measured by the other sensor devices can be used.

In the case of a further advantageous embodiment the apparatus has a receiving element for receiving the carrying element. In this case this receiving element can be a sleeve element into which the carrying element is inserted. In this case it is possible for the carrying element to have a socket portion by which it is inserted into the sleeve, but it would also be possible for the carrying element to have a threaded portion by means of which it can be screwed into the aforesaid sleeve element.

This sleeve element can in turn be arranged on a carrying arm of the apparatus for lifting motor vehicles. In this case it is possible, as is known per se from the prior art, for the lifting platform to have a plurality of carrying arms of this type, which in each case support different regions of the vehicle to be lifted, for example the four receiving points (for example the wheels) of the vehicle. The carrying element described here, however, preferably supports only one region of a vehicle, for example a specified receiving point. In this way, it is possible for the apparatus as a whole to have a plurality of carrying arms, it being preferable for one of the carrying elements described above to be arranged on each of these carrying arms. It is advantageous for the carrying elements to be arranged in such a way that the flows of force which occur pass over the individual sensor elements in each case. It is preferable in this case for the flows of force to be uniformly distributed over the respective sensor elements.

In the case of a further advantageous embodiment a drive is provided for lifting and lowering a motor vehicle. This can be, as mentioned above, hydraulic, electrical, optionally pneumatic drives and the like. It is advantageous for a control device for controlling this drive also to be provided. In this case it is preferable for this control device also to communicate with the individual sensor elements or the carrying elements respectively and preferably to control the drive for lifting and lowering the vehicle also in a manner dependent upon values issued by these sensor elements. In this case it is also possible for the control to detect deviations between the measurement results of individual carrying arms and, for example, if a deviation of this type exceeds a certain threshold value, to emit an alarm signal or to interrupt a lifting procedure.

It is advantageous for empty spaces to be arranged between the aforesaid carrying arms. In this case it is possible for the ratio of an empty space of this type in the radial direction to the central region to be in a ratio which is between 1:5 and 4:5, preferably between 1:4 and 3:4, and in a particularly preferred manner between 1:3 and 2:3, and in a particularly preferred manner between 1:3 and 1:2. It would also be possible, however, for electrical components for the carrying element to be arranged at least in part or locally respectively in these empty spaces.

In the case of a further advantageous embodiment the carrying arms of the individual carrying element are produced from a statically suitable material, for example metal, and in particular from steel, or suitable plastics materials. In the case of a further advantageous embodiment a plurality of carrying arms are provided and in a particularly advantageous manner these are uniformly distributed in the peripheral direction.

In the case of a further advantageous embodiment the carrying element has an energy storage device which supplies elements of the carrying element, such as for example an evaluation electronic device, with electrical energy. In this way, it is possible for the carrying elements to work in stand-alone operation in which an energy supply device is also incorporated. In this way, it would be possible for example for the carrying elements to have an accumulator battery which is arranged for example in a socket region of the carrying element, but optionally also in one of the intermediate spaces described above between two carrying arms.

In addition, a calibration device can be provided which calibrates the measured values before the start-up. In this case it would be possible for the individual sensor elements to be acted upon with a precisely defined force and for the calibration of the individual sensor elements to be carried out with reference to this. In this case data characteristic of a calibration of this type can be stored in each case in a memory device of this calibration device.

In the case of a further advantageous embodiment the carrying elements also have a control or processor device which detects and processes the weight values issued by the sensor elements and, in a particularly preferred manner, also calculates average values from them. In addition, it is possible for the carrying elements to have indicating devices such as for example displays for indicating a weight force. In the case of a further advantageous embodiment the carrying elements can also have identification devices such as for example RFID tags. In addition, it would be possible for the carrying elements to be supplied with an operating voltage from an external energy source, it being possible for this to be carried out for example in an inductive manner.

In the case of a further advantageous embodiment the carrying element also has a transmission device which can emit detected values, and in particular detected weight values, in a wireless manner. In this way, it is possible for the lifting platform itself also to have a receiving device which can detect the signals of these transmission devices. It is advantageous for these transmission devices to be designed in this case in such a way that, with the signal which is characteristic of weight forces, they also emit an identification signal which clearly identifies the respective carrying element. In this way, it is possible for a receiving device to allocate the signals emitted by the carrying elements or the sensor elements thereof respectively to the correct carrying elements in each case. It is also possible for the carrying element to have a receiving device for in particular the wireless reception of signals.

It is advantageous, however, for wired connections and cable connections respectively to be present between the individual sensor elements and a processor device of the carrying element. In this way, it is also possible for the carrying element described here also to be retrofitted in the case of already existing lifting platforms in order to observe legal provisions for example in this way.

In the case of a further advantageous embodiment the carrying element has at least three and preferably at least four carrying arms which starting from a central region extend in different geometrical directions. If the carrying element, as preferred, has four carrying arms, these carrying arms are advantageously arranged at an angle of 90° with respect to one another. It is advantageous for the carrying element to be made symmetrical or asymmetrical respectively, which makes possible a highly precise evaluation of the measured weight forces.

In the case of a further advantageous embodiment the sensor elements are arranged at a distance from one another. In this way, it is possible, as mentioned above, for a very precise determination of the weight forces to be carried out, in particular by averaging over the results issued by the sensor elements.

In the case of a further advantageous embodiment a support element, which has a support face for the vehicle to be lifted, is arranged on the carrying elements or on at least one carrying element respectively. In this way, it would be possible for example for a support element, for example consisting in part of a plastics material, to be arranged above or on the carrying arms. In this way it would be possible for example for this support element to be made circular or in another shape and to have for example the shape of a cap. It is advantageous for this support element also to have a suitable support face in the regions between the arms. The component of a vehicle, for example a receiving point, is preferably set down on this support face. It is advantageous in this case for this support element to be capable of being dismantled from the carrying arms and thus preferably also interchangeable.

In the case of a further advantageous embodiment at least one sensor element is associated with a surface of the carrying arm facing the vehicle to be lifted. This means that in the case of the normal arrangement this sensor element is arranged on a top side of the carrying arms and, in this way, is stressed substantially directly by a weight forces of the vehicle to be lifted. It is advantageous for the sensor element to be arranged between the carrying arm and the support element, and in particular between a surface of the carrying arm and an underside of the support element. It is preferable in this case for this sensor element to be formed in a surface of the carrying arm or to be arranged on this surface respectively. It is preferable in this case for this sensor element to project at least slightly beyond the aforesaid surface of the carrying arm.

In the case of a further advantageous embodiment at least one sensor element has a strain gauge. It is advantageous for all the sensor elements to be formed with strain gauges. It is advantageous for this strain gauge to be arranged on the carrying arm by way of an adhesive. It is advantageous for this strain gauge to be arranged radially inside that region by way of which the force is applied to the respective carrying arm. Other sensor elements, however, would also be possible.

In the case of a further advantageous embodiment the support element mentioned above has a metallic body. In particular in this case the metallic body is formed or incorporated in the support element mentioned above. In this case it is possible for this metallic body to be enclosed completely by the support element or the material thereof respectively. It is advantageous for this metallic body to be a steel disc or generally a metallic disc, which distributes the forces absorbed. As mentioned above, however, the metallic disc transmits these forces point-wise over the individual carrying arms again and thus also over the individual sensor elements. In this way, it is advantageous for the support element to have a plastics material jacket, for example a rubber jacket, which surrounds the aforesaid metallic body.

In the case of a further advantageous embodiment the support element is capable of being fastened to the carrying element by means of connecting devices. In this case it is possible for example for the support element to be screwed to the carrying element by means of screw fastenings. These screw fastenings can be provided in this case between the support element and the individual carrying arms.

In the case of a further advantageous embodiment the apparatus has at least two carrying elements for carrying the vehicle to be lifted. It is advantageous for the apparatus to have at least three, and in a particularly preferred manner at least four, carrying elements for carrying or lifting respectively the motor vehicle. It is advantageous for the weight force acting upon the at least three carrying elements to be detected separately and for the overall weight in turn preferably to be determined from this. In addition, however, it is also preferable for a weight force acting upon the individual carrying elements to be compared, as described above.

In the case of a further advantageous embodiment the apparatus also has a display device which displays a weight force acting upon the individual carrying elements. The present invention further relates to a carrying element for an apparatus for lifting motor vehicles, this carrying element having at least one sensor device for detecting a weight force and/or a value which is characteristic of this weight force of the vehicle to be lifted. In addition, the carrying element has at least two carrying arms which are arranged in a central region of the carrying element and which starting from the central region extend in at least two different directions, the carrying element additionally having a connecting body by which it is capable of being connected to the carrier of an apparatus for lifting motor vehicles. According to the invention at least one sensor element is provided in each case on these carrying arms in order to detect a partial weight force, a force determination device for determining the weight force taking into consideration the partial weight forces determined or measured by the two sensor elements and the at least two sensor elements being arranged at a distance from each other.

It is advantageous for the carrying element itself to be a portable element and to be capable of being retrofitted in this way on already existing lifting platforms. It is advantageous for a mass of this carrying element to be between 300 g and 7 kg, preferably between 500 g and 5 kg.

It is advantageous for the carrying arms to be formed in one piece with the central region. In this case it is also possible for this central region itself to be a component part of a carrying arm. It is advantageous for the carrying element also to have a socket region with which it can be inserted for example into a receiving sleeve. It is advantageous for the carrying arm also to have a receiving space for receiving an energy storage means, such as in particular a battery. In addition, it is also possible for the carrying arm to have a power connection to order to connect an external power source or to charge a battery.

It is advantageous for the carrying element to have a symmetrical shape. It is particularly preferred for the carrying element to be formed in the manner described above.

Further advantages and embodiments are evident from the accompanying drawings. In the drawings FIG. 1 is a diagrammatic illustration of an apparatus for lifting motor vehicles;

FIGS. 2a, b are two diagrammatic illustrations of a carrying element;

FIG. 3 is an illustration of a carrying element with a support element, and

FIGS. 4a, 4b are two illustrations of the lower part of the support element.

Figure 1:
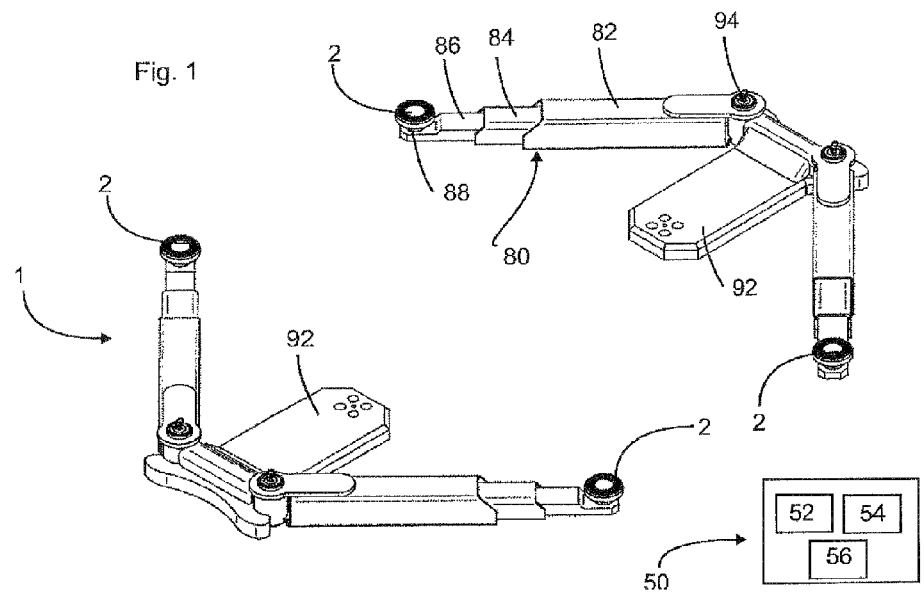

FIG. 1 is a partial illustration of an apparatus 1 according to the invention for lifting motor vehicles. In this case two carrying plates 92 are provided on which can be arranged for example two columns (not shown) which move in a preferably vertical direction in order to lift or lower respectively a motor vehicle (not shown). Altogether four main arms 80 are arranged on these main carriers 92 so as to be pivotable by way of joints 94. In this case these main arms 80 have three main arm segments 82, 84 and 86 which are displaceable with respect to one another in a telescopic manner in each case. A carrying element is arranged on the ends of these arms in each case by way of a sleeve body (not shown in a precise manner). The receiving points of the motor vehicle can rest on this carrying element here for example. As a result of the telescopic displaceability of the main arm segments 82, 84 and 86 and also as a result of the pivotability of the main arms substantially any desired setting to different track widths or wheel bases can be achieved.

The reference number 50 designates a central control and/or evaluation unit which evaluates the weight forces determined by the individual carrying elements 2. This control and/or evaluation unit has in this case a display device 52 which displays the measured weight values to the user. In addition, a memory device 54 is also provided, in which reference values for weight values to be determined can preferably be saved. In addition, a comparator 56 can be provided which compares the measured weight values with the weight values saved in the memory device 54. The control unit 50 can also control in this case a drive which carries out a lifting and lowering of the vehicle. This control unit can communicate with the individual carrying elements 2 preferably in a wireless manner.

Figures 2A, 2B:
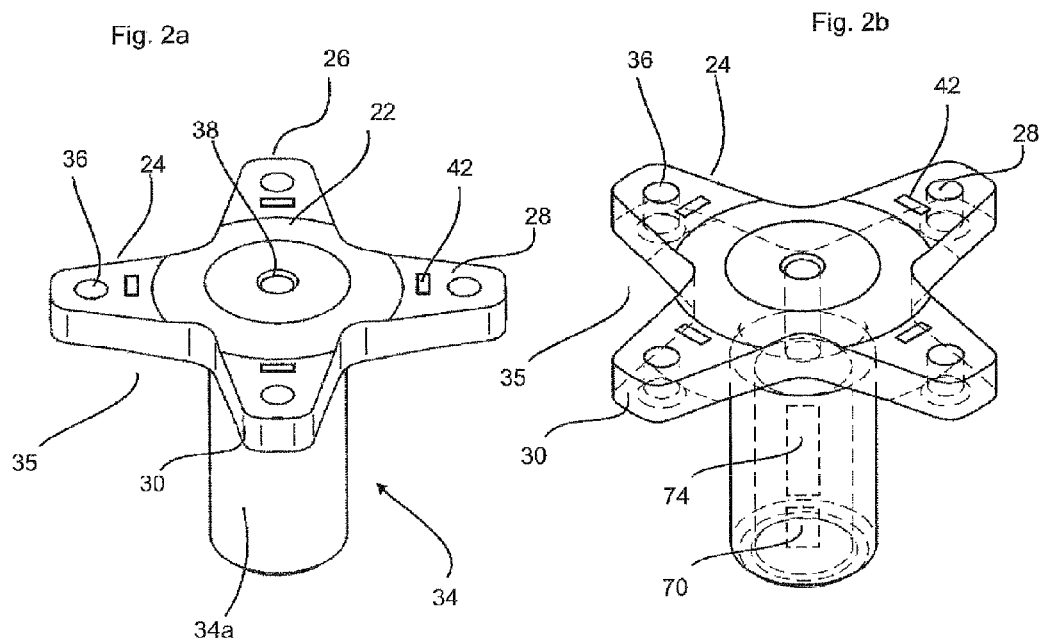

FIGS. 2a and 2b show a carrying element 2, in particular for an apparatus according to the invention. This carrying element 2 has in this case a central region 22 in which four carrying arms 24, 26, 28 and 30 are arranged in this case. It will be noted that these carrying arms taper radially outwards in each case. The reference number 35 designates an intermediate space between two carrying arms which is made empty in this case. It would also be possible, however, for processor devices or receiving means for example for an energy storage device, such as a battery, to be provided in this intermediate space 35.

The reference number 38 designates a cavity inside the carrying element, in which energy storage devices, such as batteries but also control components, can likewise optionally be arranged.

The reference number 34 designates a socket region which in this case is formed in one piece on the carrying element 2 or with the carrying element 2 respectively. This socket region can have in this case for example an external thread 34a by means of which it is capable of being screwed into a receiving sleeve. An individual vertical adjustment of a plurality of carrying elements can also be carried out in this case by this screwing in, so that the vehicle rests on the respective lifting platform in a uniform manner or with weight forces distributed in a uniform manner respectively.

The reference number 36 designates a connecting means by which for example a support element can be screwed to the carrying element 2. In addition, it would be possible for a connecting means, such as for example a screw body, to be screwed into the opening 38.

The reference numbers 42 designate sensor elements which in this case are arranged on the individual carrying arms 24, 26, 28 and 30 or the upper surfaces thereof respectively. In this way, the individual sensor elements are arranged separately from one another, but equidistantly from one another. A weight, such as in particular a motor vehicle, which loads the carrying element 2 will introduce its forces into the carrying element 2 by way of the individual sensor elements in each case and, in this way, a very precise pointwise detection of the individual forces and thus also the overall force is possible. Expressed more precisely, the individual carrying arms will be deformed slightly in each case under the weight of the vehicle and this deformation is detected by the sensor elements 42.

FIG. 2b shows that in the interior of the socket region there can be arranged for example an energy storage means 74, such as a battery, as well as a processor device 70, which detects the signals emitted by the individual sensor elements 42 and determines a value from them which is characteristic of a weight force which loads the carrying element. This processor device is also the force determining device described in the introduction.

FIG. 3 is a sectional illustration of a carrying element 2 with a support element 6 arranged on it. This support element is formed in a multiplicity of parts in this case and has a support face 6a on which the receiving point of a motor vehicle can be arranged for example. The upper part—designated 64 as a whole—of the support element 6 is connected to a lower part 66 in the peripheral direction. For this purpose the lower part has a continuous projection 66a which engages in a corresponding recess 64a in the upper part. It would also be possible, however, for the projection to be arranged in an upper part and for a corresponding recess to be arranged in the lower part 66.

In addition, a disc-shaped body 62 is provided, which is arranged in the interior of the support element. This disc-shaped body serves to receive the weight force which is exerted by the motor vehicle. The reference number 72 designates a connecting body, such as for example a screw, by which the lower part 66 of the support element is screwed to the carrying arm 24. It will be noted in this case that an end portion of the screw body 72 is still situated at a distance from the metallic disc 62.

Nevertheless, when the support element is loaded the introduction of force will take place in any case by way of the sensor element 42 or the sensor element can detect a corresponding deformation of the carrying arm 24 respectively. It may be seen that a recess, in which for example a battery can be arranged, is formed inside the socket region 34. In addition, cable connections (not shown) can also lead to the individual sensor elements 42.

FIGS. 4a and 4b are two illustrations of the lower part 66 of the receiving element 6. The openings 66a, by way of which the connecting elements 72 can be screwed in, are evident in this case. The reference 66d designates a recess in the lower part 66 in which the disc body 62 in turn can be arranged. The reference 66c designates a peripheral edge of the lower part 66 which surrounds the carrying element 2 in the peripheral direction. The reference 66b designates an annular portion of the lower part 66 which rests in each case on the individual arms 24, 26, 28 and 30 of the carrying element 2 in the assembled state.

Polyamide (PA) could be used for example as the material for the support element. It is preferable for the material for the support element to be a glass-fibre-reinforced plastics material.

The Applicants reserve the right to claim all the features disclosed in the application documents as being essential to the invention, insofar as they are novel either individually or in combination as compared with the prior art.

LIST OF REFERENCES

1 apparatus
2 carrying element
6 support element
6a support face
22 central region
24, 26, 28, 30 carrying arms
35 intermediate space
34 socket region
34a external thread
36 connecting means
38 cavity/opening
42 sensor elements
50 control and/or evaluation unit
52 display device
54 memory device
56 comparator device
62 metallic disc
64 upper part
64a recess
66 lower part
66a projection/opening
66b annular portion
66c peripheral edge
66d recess of the lower part
72 connecting body
74 energy storage means, battery
80 main arms
82, 84, 86 main arm segments
92 carrying plates/main carriers
94 joints

The invention claimed is:

1. An apparatus for lifting motor vehicles, with a carrying element for carrying the motor vehicle to be lifted, wherein this carrying element has at least one sensor device for detecting a weight force of the vehicle to be lifted, wherein the carrying element has at least two carrying arms which are arranged in a central region of the carrying element and which starting from the central region extend in at least two different directions, wherein at least one sensor element for detecting a partial weight force is arranged in each case on these carrying arms, wherein a force determining device for determining the weight force takes into consideration the partial weight forces determined by the at least three sensor elements.

2. The apparatus according to claim 1, wherein the carrying element has at least three carrying arms which starting from the central region extend in different geometrical directions.

3. The apparatus according to claim 2, wherein the carrying element has at least four carrying arms which starting from the central region extend in different geometrical directions.

4. The apparatus according to claim 1, wherein the sensor elements are arranged at a distance from one another.

5. The apparatus according to claim 2, wherein the sensor elements are arranged at a distance from one another.

6. The apparatus according to claim 3, wherein the sensor elements are arranged at a distance from one another.

7. The apparatus according to claim 4, wherein the sensor elements are arranged at a distance from one another.

8. The apparatus according to claim 1, wherein a support element, which has a support face for the vehicle to be lifted, is arranged on the carrying elements.

9. The apparatus according to claim 1, wherein at least one sensor element is arranged on a surface of a carrying arm facing the vehicle to be lifted.

10. The apparatus according to claim 1, wherein at least one sensor element has a strain gauge.

11. The apparatus according to claim 8, wherein a metallic body is incorporated in the support element.

12. The apparatus according to claim 8, wherein the support element is capable of being fastened to the carrying element by connecting devices.

13. The apparatus according to claim 8, wherein the support element is capable of being fastened to the carrying element in a direct manner.

14. The apparatus according to claim 1, wherein the apparatus has at least two carrying elements for carrying the vehicle to be lifted.

15. A carrying element for an apparatus for lifting motor vehicles, wherein this carrying element has at least one sensor device for detecting a value which is characteristic of the weight force of the vehicle to be lifted, wherein the carrying element has at least two carrying arms which are arranged in a central region of the carrying element and which starting from the central region extend in at least two different directions, and wherein the carrying element additionally has a connecting body by which it is capable of being connected to a carrier of the apparatus for lifting motor vehicles, wherein least one sensor element is provided in each case on these carrying arms in order to detect a partial weight force, wherein a force determination device for determining the weight force takes into consideration the partial weight forces determined by the at least two sensor elements and wherein the at least two sensor elements are arranged at a distance from each other.

\* \* \* \* \*